(12) United States Patent
Hirzel et al.

(10) Patent No.: US 9,476,643 B2
(45) Date of Patent: Oct. 25, 2016

(54) HEAT RECOVERY SYSTEM

(75) Inventors: Nicholson Hirzel, Augusta, MI (US); James Breslin, Zeeland, MI (US)

(73) Assignee: Kellogg Company, Battle Creek, MI (US)

( * ) Notice: Subject to any disclaimer, the term of this patent is extended or adjusted under 35 U.S.C. 154(b) by 1237 days.

(21) Appl. No.: 13/432,051

(22) Filed: Mar. 28, 2012

(65) Prior Publication Data

US 2012/0246967 A1 Oct. 4, 2012

Related U.S. Application Data

(60) Provisional application No. 61/468,793, filed on Mar. 29, 2011.

(51) Int. Cl.
| | |
|---|---|
| *F26B 3/00* | (2006.01) |
| *F26B 25/06* | (2006.01) |
| *F26B 23/00* | (2006.01) |
| *F26B 15/12* | (2006.01) |

(52) U.S. Cl.
CPC ............. *F26B 23/002* (2013.01); *F26B 15/12* (2013.01); *Y02P 70/40* (2015.11); *Y02P 70/405* (2015.11)

(58) Field of Classification Search
CPC ............. F28D 21/001; F28D 21/0003; F28D 21/0014; F26B 23/001; F26B 23/002; F26B 25/006
USPC ................... 34/476, 477, 212, 219, 86, 514; 432/152
See application file for complete search history.

(56) References Cited

U.S. PATENT DOCUMENTS

| | | | |
|---|---|---|---|
| 969,031 | A | 8/1910 | Bratkowski |
| 3,380,174 | A * | 4/1968 | McClaren ............... F26B 9/063 34/169 |
| 3,886,855 | A | 6/1975 | Nara |
| 4,099,338 | A | 7/1978 | Mullin et al. |
| 4,109,394 | A | 8/1978 | Hoyt |
| 4,201,499 | A | 5/1980 | Buske et al. |

(Continued)

FOREIGN PATENT DOCUMENTS

| | | |
|---|---|---|
| DE | 1532904 A1 | 3/1970 |
| DE | 2448902 | 7/1976 |

(Continued)

*Primary Examiner* — Kenneth Rinehart
*Assistant Examiner* — John McCormack
(74) *Attorney, Agent, or Firm* — Honigman Miller Schwartz and Cohn LLP; Kathryn D. Doyle, Esq.; Jonathan P. O'Brien

(57) ABSTRACT

The heat recovery system includes an oven having a treatment air with a treatment air temperature and a treatment air dew point temperature to treat a product or product in process. A zone outlet exhaust waste treatment air following the treatment of the product. A preheating zone includes a preheating inlet for the introduction of preheating air having a preheating air temperature and a preheating air dew point temperature to preheat the product. A transfer duct extends between the zone outlet of the oven and the preheating zone to transfer a portion of waste treatment air from the oven to the preheating zone to create the preheating air to preheat additional product. The preheating air preheats the product in the preheating zone to a product temperature that is at least equal to the treatment air dew point temperature to eliminate surface condensation on the product during treatment in the oven.

20 Claims, 4 Drawing Sheets

(56) References Cited

U.S. PATENT DOCUMENTS

| | | |
|---|---|---|
| 4,306,359 A | 12/1981 | Hoyt |
| 4,569,658 A | 2/1986 | Wiggins et al. |
| 4,615,123 A | 10/1986 | Brown |
| 4,648,314 A | 3/1987 | Plicht et al. |
| 4,836,098 A | 6/1989 | Shah |
| 4,876,426 A | 10/1989 | Smith |
| 4,956,271 A | 9/1990 | Milone |
| 4,961,373 A | 10/1990 | Milone |
| 5,142,794 A * | 9/1992 | Meiners ............... F26B 23/002 34/225 |
| 5,386,764 A | 2/1995 | Ratajczek |
| 5,555,636 A | 9/1996 | Kramer et al. |
| 5,603,168 A * | 2/1997 | McMahon, Jr. ...... F26B 13/005 34/212 |
| 5,651,191 A | 7/1997 | Walunas et al. |
| 2006/0168842 A1 | 8/2006 | Sprague |
| 2007/0214676 A1 * | 9/2007 | Zahedi ................... F23J 15/025 34/86 |
| 2009/0181126 A1 | 7/2009 | Wicking et al. |

FOREIGN PATENT DOCUMENTS

| | | |
|---|---|---|
| DE | 3610124 C1 | 7/1987 |
| DE | 19638073 A1 | 3/1998 |
| EP | 1293127 A2 | 3/2003 |
| EP | 1969941 A2 | 9/2008 |
| GB | 2146884 A | 5/1985 |
| WO | 2006088530 A2 | 8/2006 |

* cited by examiner

Fig-1

HEAT RECOVERY SYSTEM

CROSS REFERENCE TO RELATED APPLICATION

This application claims the benefit of U.S. Provisional Patent Application Ser. No. 61/468,793 for a HEAT RECOVERY SYSTEM, filed on Mar. 29, 2011, which is hereby incorporated by reference in its entirety.

BACKGROUND OF THE INVENTION

1. Field of the Invention

The subject invention relates to a heat recovery system for use is an oven to recycle waste treatment air used to treat a product in process in a downstream oven zone and create a preheating air to preheat the product in process in a preheating zone prior to entering the downstream oven zone.

2. Description of the Prior Art

U.S. Pat. No. 4,569,658 to Wiggins et al. discloses an oven system having a baking chamber broken into a plurality of zones. Each zone includes an inlet duct 11 leading into the zone and an outlet duct 8 leading out from the zone. The outlet duct is used to extract exhaust gases from the associated zone and transfer them to an exhaust flue 18. The waste heat present in the exhaust gases are used to raise the temperature of the inflowing ambient air introduced to the inlet duct 11. A heat exchanger 14 is present to transfer heat from the exhaust gases to the inflowing ambient air. The rate at which the ambient air is supplied and exhaust gases are extracted may be varied to compensate for varying rates of steam along the oven.

U.S. Pat. No. 4,109,394 to Hoyt discloses an air flow system for the treatment of particulate materials along a conveyor. The system provides for the flow of fluidizing air to the particulate treatment zone via an array of nozzles 40 arranged to project gaseous streams downwardly against the conveyor and a plurality of ducts 80 arranged to project gaseous streams inwardly along the conveyor. The system includes a housing having a conditioning plenum 48 and a main pressure plenum 46. A plurality of exhaust ports 62 are included to exhaust gases from the system and transport the gases to a cyclone 70. The gases from the cyclone 70 are returned to the housing through duct 72 for flow into the conditioning plenum 48. In the conditioning plenum, the returned gases are heated or cooled as desired and then fed to the main pressure plenum 46 via a blower 50. The main pressure plenum 46 feeds the gases to the nozzles 40 and ducts 80 to treat the particulates along the conveyor. The system recycles the gases within a zone.

U.S. Pat. No. 5,142,794 to Meiners discloses a system for the pretreatment of corn or other grains using the exhaust air from conventional dryer 10. Hot moist air is exhausted from the conventional dryer and transported via a conduit 26 to a steeping container 12 where the corn is pre-treated. The system includes a monitor device 28 to monitor the humidity and temperature of the hot moist exhaust air in the conduit 26. The monitor device 28 is in communication with a heater 30 which is selectively activated to control the humidity and temperature of the exhaust air as it is transported to the steeping container 12. The dryer 10 includes a second exhaust through which cool exhaust air from the dryer 10 is introduced into the conduit 26. The conduit 26 feeds the conditioned exhaust air from the dryer 10 to the steeping container 12 in order to pre-treat the corn or grain in the steeping container 12. The result is a grain with uniform moisture levels being fed from the steeping container 12 to the dryer 10.

SUMMARY OF THE INVENTION

In the first exemplary embodiment, the subject invention provides for a heat recovery system for use in an oven. In this exemplary embodiment, both the oven and preheating zone may be a single pass oven. The system recycles waste treatment air used to treat a product in process in a downstream oven zone to create a preheating air to preheat the product in process in a preheating zone prior to entering the downstream oven zone. The oven includes at least one oven zone having a zone inlet and a zone outlet for treating the product in process. The zone inlet introduces treatment air having a treatment air temperature and treatment air dew point temperature into the oven zone for treating the product in process. The zone outlet exhausts the waste treatment air following the treatment of the product in process. An oven duct assembly extends from the zone outlet to exhaust the waste treatment air following the treatment of the product in process. A preheating zone is disposed upstream of the oven zone to preheat the product in process prior to entering the at least one oven zone. The preheating zone includes a preheating inlet for the introduction of preheating air for preheating the product in process. The preheating air has a preheating air temperature and a preheating air dew point temperature. A transfer duct extends between the oven duct assembly and the preheating zone to transfer a portion of waste treatment air from the oven duct assembly to the preheating zone to create the preheating air to preheat additional product in process. The preheating air preheats the product in process in the preheating zone to a product temperature that is at least equal to the treatment air dew point temperature, thus eliminating sweat or surface condensation on the product in process during treatment in the downstream oven zone.

In an alternative exemplary embodiment, the system recycles treatment air used to treat a product in process in a downstream oven zone to condition waste preheating air for creating a preheating air to preheat the product in process in a preheating zone prior to entering the downstream oven zone. In this exemplary embodiment, both the oven and preheating zone are recirculated ovens. The oven includes at least one oven zone having a zone inlet and a zone outlet for treating the product in process. The zone inlet introduces treatment air having a treatment air temperature and treatment air dew point temperature into the oven zone for treating the product in process. The zone outlet exhausts the waste treatment air following the treatment of the product in process. An oven duct assembly extends from the zone outlet to the zone inlet for exhausting the waste treatment air following the treatment of the product in process, and conditioning the waste treatment air in the oven duct assembly for creating new treatment air to treat additional product in process. A preheating zone is disposed upstream of the oven zone to preheat the product in process prior to entering the at least one oven zone. The preheating zone includes a preheating inlet for the introduction of preheating air to preheat the product in process and a preheating outlet to exhaust the waste preheating air following the preheating of the product in process. The preheating air has a preheating air temperature and a preheating air dew point temperature. A preheating duct assembly extends from the preheating outlet to the preheating inlet to exhaust the waste preheating air from the oven following the preheating of the product in process in the oven. The waste preheating air is conditioned or recycled in the preheating duct assembly to create new preheating air having the preheating air temperature and the preheating air dew point temperature. The new preheating air is introduced into the preheat zone through the preheating inlet to preheat additional product in process. A transfer duct extends between the oven duct assembly and the preheating duct assembly to transfer a portion of waste treatment air from the oven duct assembly to the preheating duct assembly to condition the waste preheating air in the preheating duct assembly. The waste treatment air heats the waste preheating air to create the new preheating air to preheat additional product in process. The preheating air preheats the product in process in the preheating zone to a product temperature that is at least equal to the treatment air dew point temperature, thus eliminating sweat or surface condensation on the product in process during treatment in the downstream oven zone.

The subject invention further provides for a method of recycling waste treatment air used in a downstream oven zone of an oven to create a preheating air to preheat a product in process prior to entering the downstream zone. The method begins by exhausting waste treatment air through a zone outlet in the oven zone following the treatment of a product in process. A portion of the waste treatment air is then transferred to the preheating zone through a transfer duct that extends between the oven duct assembly and the preheating zone. A preheating air having a preheating air temperature and a preheating air dew point temperature is created from the portion of the waste treatment air that is transferred to the preheating zone from the oven duct assembly to preheat additional product in process. Lastly, the preheating air is introduced into the preheating zone through a preheating inlet to preheat additional product in process to a product temperature that is at least equal to the treatment air dew point temperature, thus eliminating sweat or surface condensation on the product in process during treatment of the product in process in the downstream oven zone.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a schematic of an exemplary heat recovery system according to the subject invention;

DETAILED DESCRIPTION OF THE ENABLING EMBODIMENTS

Referring to the Figures, wherein like numerals indicate corresponding parts throughout the several views, a heat recovery system 20 for use in an oven 22 and for recycling treatment air used to treat a product in process in a downstream oven zone 24 to create a preheating air for preheating the product in process in a preheating zone 26 prior to entering the downstream oven zone 24 is generally shown.

Figure 1:
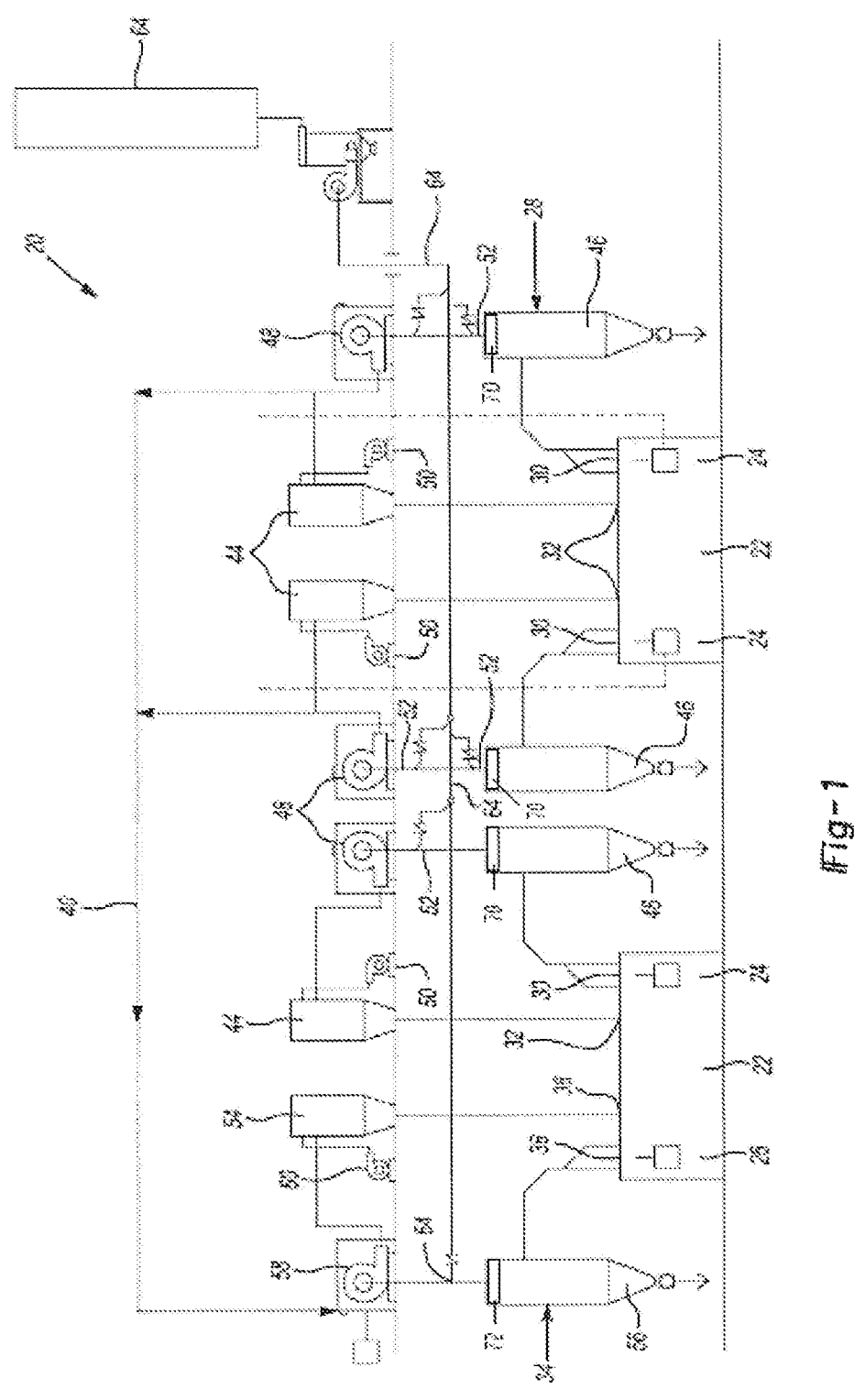
Figure 2A:
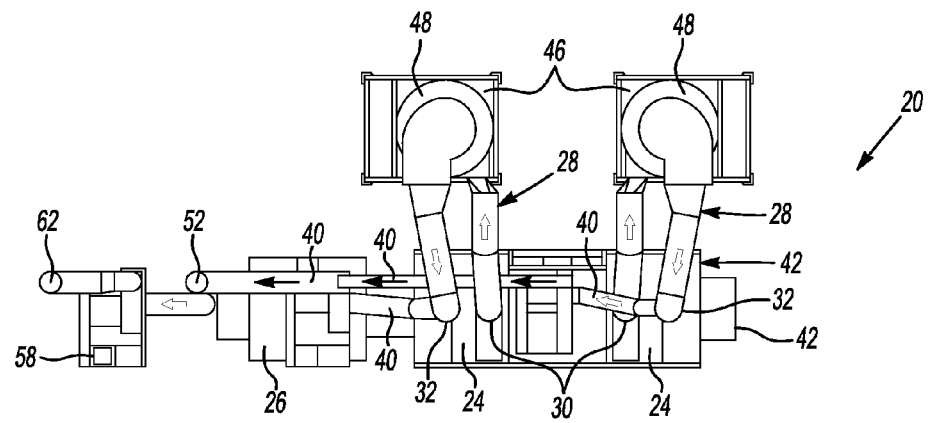
FIG. 2A is a partial top view of an exemplary multi-zone recirculated oven and a single pass preheating zone incorporating the heat recovery system according to the subject invention.
Figure 2B:
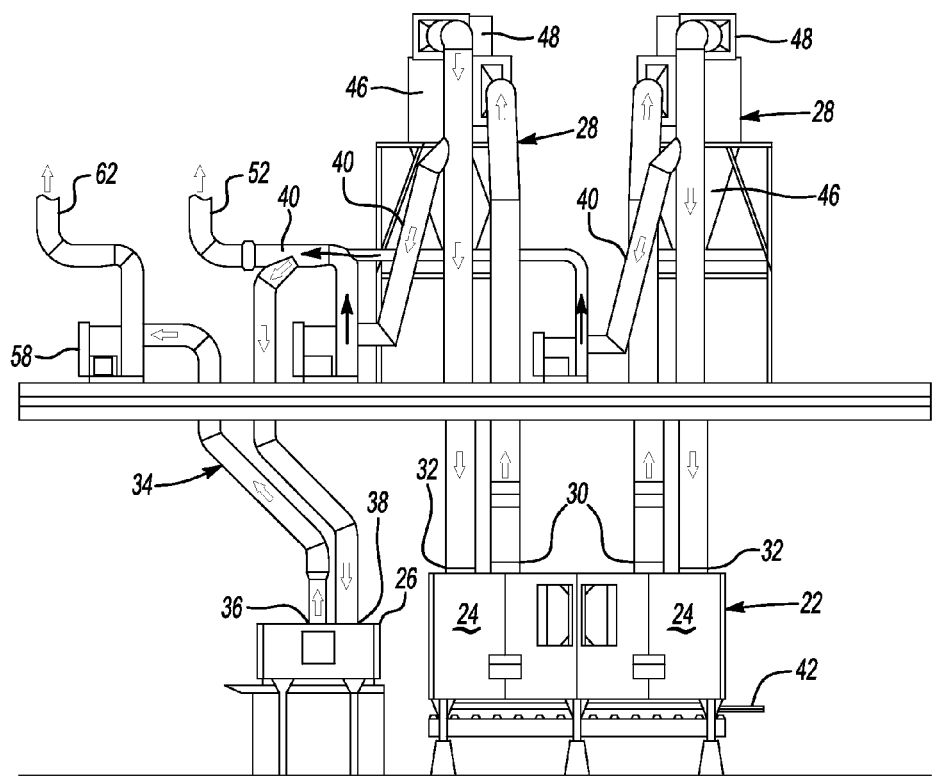
FIG. 2B is a partial front view of the exemplary multi-zone recirculated oven and the single pass preheating zone incorporating the heat recovery system according to the subject invention.
Figure 3:
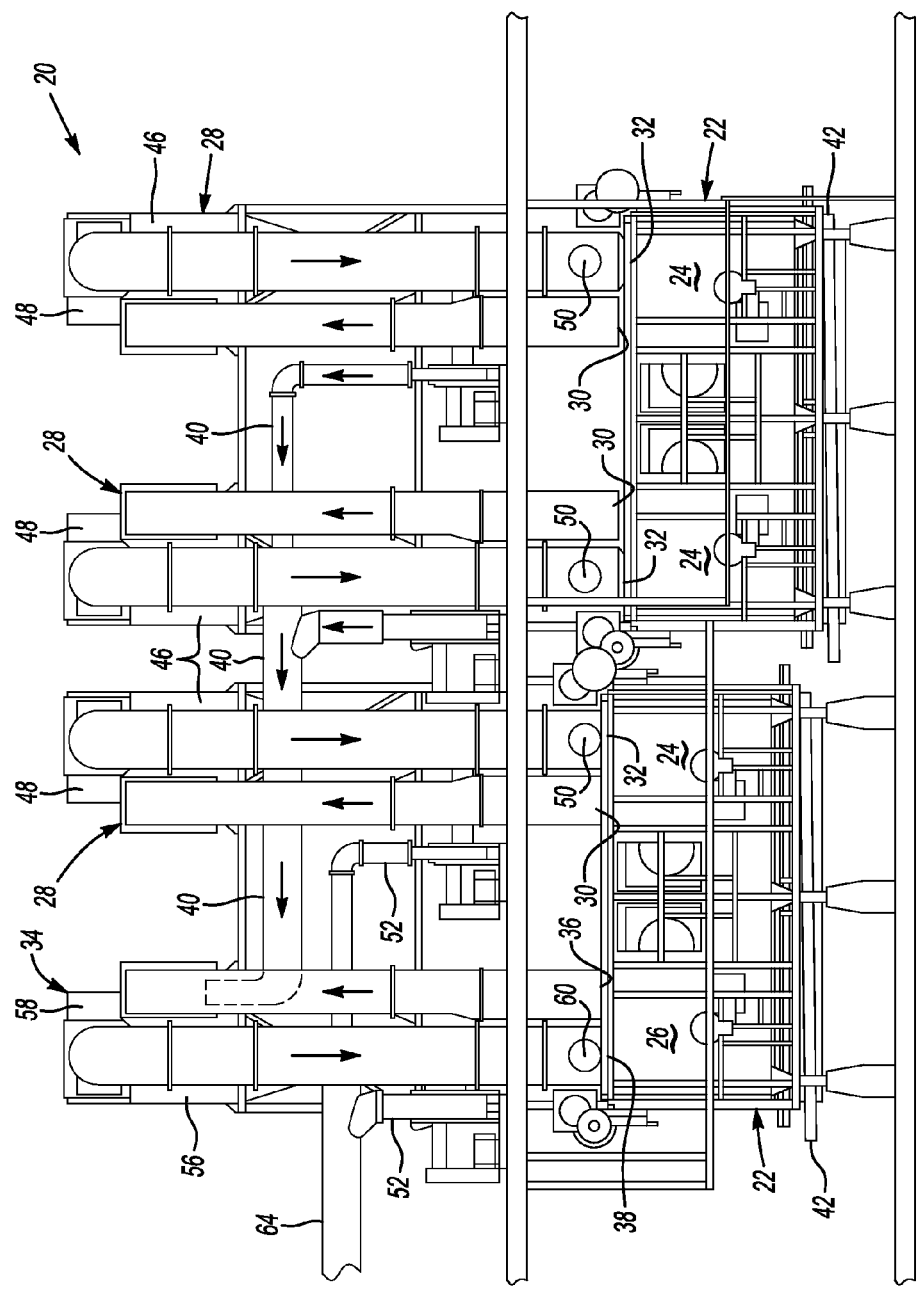
FIG. 3 is a partial front view of an exemplary multi-zone recirculated oven incorporating the heat recovery system according to the subject invention.
Figure 4:
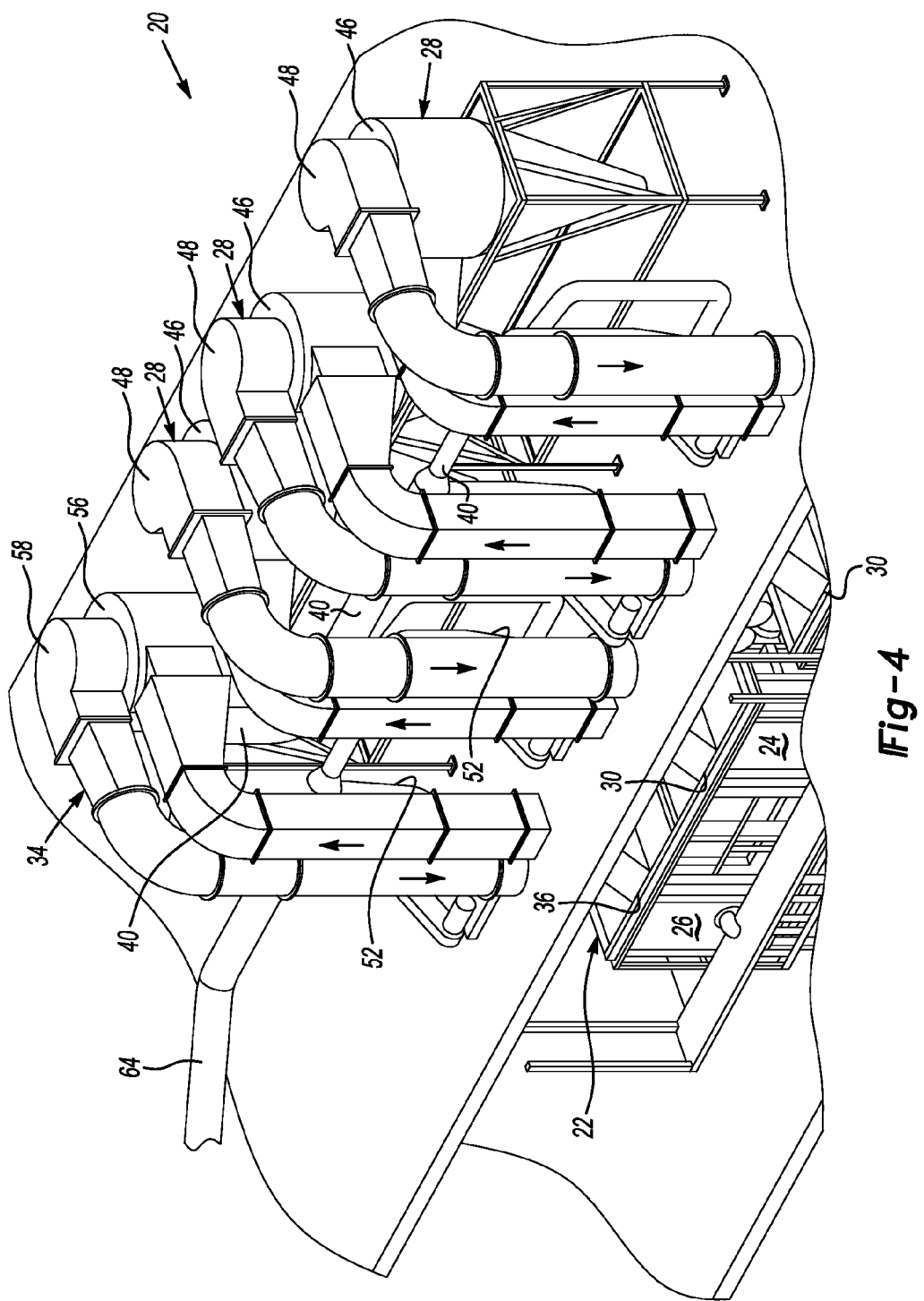
FIG. 4 is a partial perspective view of the multi-zone recirculated oven incorporating the heat recovery system as shown in FIG. 3.

The subject invention can be used with any combination of ovens 22 and preheating zones 26 known in the art, including any single pass or recirculated oven 22 or preheating zone 26 known in the art. It should be noted that the preheating zone 26 may be an oven 22 or an oven zone 24 in an oven 22. Single pass ovens 22 or preheating zones 26 include, but are not limited to direct gas fire ovens, convection ovens, hybrid ovens, indirect gas fire ovens, and infrared ovens. Recirculated ovens 22 or preheating zones 26 may include, but are not limited to any recirculated convection oven known in the art. While the detailed exemplary embodiment below teaches the use of recirculated ovens for both the oven 22 and preheating zone 26, the heat recovery system 20 can be any combination of ovens 22 and preheating zones 26 known in the art. In one exemplary embodiment, both the oven 22 and preheating zone 26 can be single pass ovens. In a second embodiment as seen in FIGS. 1, 3 and 4, both the oven 22 and preheating zone 26 can be recirculated ovens. In another exemplary embodiment as seen in FIG. 2, one of the oven 22 and the preheating zone 26 can be a recirculated oven, with the other of the oven 22 and the preheating zone 26 being a single pass oven.

In a first exemplary embodiment, both the at least one oven 22 and preheating zone 26 are single pass ovens, and the heat recovery system 20 recycles the waste treatment air used to treat the product in process in the downstream oven zone 24 to create the preheating air for preheating the product in process in the preheating zone 26 prior to entering the downstream oven zone 24. The oven 22 includes at least one oven zone 24 to treat the product in process. The oven zone 24 includes a zone inlet 32 for the introduction of the treatment air having the treatment air temperature and the treatment air dew point temperature to treat the product in process. The oven zone 24 further includes a zone outlet 30 to exhaust the waste treatment air following the treatment of the product in process. The oven duct assembly 28 extends from the zone outlet 30 to exhaust the waste treatment air following the treatment of the product in process. The preheating zone 26 is disposed upstream of the oven 22 to preheat the product in process prior to entering the at least one oven zone 24. The preheating zone 26 includes the preheating inlet 38 for the introduction of the preheating air having the preheating air temperature and the preheating air dew point temperature to preheat the product in process. The transfer duct 40 extends between the oven duct assembly 28 and the preheating zone 26 for transferring a portion of waste treatment air from the oven duct assembly 28 to the preheating zone 26. The preheating air is created from the waste treatment air to preheat additional product in process prior to entering the at least one oven zone 24. The preheating air preheats the product in process in the preheating zone 26 to a product temperature being at least equal to the treatment air dew point temperature to eliminate surface condensation on the product in process during treatment in the oven zone 24.

The preheating air is created from the waste treatment air to preheat additional product in process prior to entering the at least one oven zone 24. The preheating air can be created from the waste treatment air by conditioning the waste treatment air that is transferred to the preheating zone 26. Conditioning of the waste treatment air includes, but is not limited to at one of bleeding off a portion of the waste treatment air, heating the waste treatment air, diluting the waste treatment air with ambient air or any combination thereof to achieve a desired preheating air temperature and preheating air dew point temperature.

In a second exemplary embodiment as seen in FIGS. 1, 3 and 4, both the oven 22 and preheating zone 26 can be recirculated ovens 22. The second exemplary embodiment generally provides for a heat recovery system 20 having an oven duct assembly 28 that extends from a zone outlet 30 to a zone inlet 32 of an oven 22 to exhaust and condition waste treatment air following the treatment of product in process and create new treatment air to treat additional product in process in the oven zone 24. A preheating duct assembly 34 extends from a preheating outlet 36 to a preheating inlet 38 of a preheating zone 26 to exhaust and condition waste preheating air following the preheating of product in process and create new preheating air to preheat additional product in process. A transfer duct 40 extends between the duct assemblies 28, 34 to transfer a portion of waste treatment air from the oven duct assembly 28 to the preheating duct assembly 34. The waste treatment air heats the waste preheating air to condition and create the new preheating air. The preheating air preheats the product in process in the preheating zone 26 to a product temperature that is at least equal to the treatment air dew point temperature.

The heat transfer system is used to preheat and treat products in process. The product in process may be any type of product, known in the art, that is moved through an oven during processing. Examples include, but are not limited to, food products, such as a particulate material that uses multi-zone ovens 22 to treat the grain based product. In addition, the product in process may be a brick that is processed in a brick oven, or any other type of product, known in the art, that is moved through an oven during processing. In the exemplary embodiment, the product in process is a grain based cereal product and includes at least one cereal grain, but the grain based cereal product may be any grain based product known in the art. Cereal grains include, but are not limited to, rice, wheat, maize, barley, oats, *sorghum*, rye and triticale. For purposes of this application, treat or treatment, can be any oven process known in the art of baking, including but not limited to, drying, toasting, rehydrating, fermenting and baking. The product in process may be a plurality of products in process disposed individually along a transfer device 42 or a continuous slab of product in process.

The heat transfer system includes a transfer device 42 that moves the product in process in a downstream direction. The transfer device 42 may be any transfer device 42 known in the art, including, but not limited to, an oven belt, belt conveyor and roller conveyor. In addition, the transfer device 42 may be a drop system where the product in process is drop through the oven 22. An oven 22 having at least one longitudinally extending oven zone 24 to treat the product in process, is disposed over the transfer device 42. The oven 22 defines a passageway therethrough for the placement of the transfer device 42 through the oven 22. While the exemplary embodiment discusses the use of a single oven zone 24 for treating the product in process, a plurality of oven zones 24 may be used. The plurality of oven zones 24 may be placed in series along the transfer device 42 and perform any treatment process known in the art. Again, treatment can include drying, toasting, rehydrating, fermenting and baking of the product in process.

The at least one oven zone 24 includes a zone inlet 32 for the introduction of treatment air having a treatment air temperature and treatment air dew point temperature for treating the product in process. The zone inlet 32 is defined in the oven zone 24 to allow for the introduction of treatment air into the zone oven 22. A zone outlet 30 is also defined in the oven zone 24 to allow for the waste treatment air to be exhausted following the treatment of the product in process.

An oven duct assembly 28 extends from the zone outlet 30 to the zone inlet 32. The oven duct assembly 28 may be any type of duct work known in the art. The oven duct assembly 28 exhausts the waste treatment air from the oven zone 24 following the treatment of the product in process and transfers the waste treatment air away from the zone outlet 30. In the exemplary embodiment, the oven duct assembly 28 transfers the waste treatment air to the zone inlet 32 to be recycled and used again as treatment air to treat the product in process. In alternative embodiment, where the oven 22 is a single pass oven, the oven duct assembly 28 may transfer the waste treatment air away from the oven 22 and out of the facility housing the oven 22.

In order for the waste treatment air to be reused as treatment air, the waste treatment air may need to be conditioned. The waste treatment air may be conditioned in the oven duct assembly 28 to create new treatment air to treat additional product in process. That is, the original treatment air is fed into the zone oven 22 through the zone inlet 32 at a specific treatment air temperature and treatment air dew point temperature. After the treatment air has treated, i.e., dried, baked, rehydrated, fermented or toasted, the product in process, the waste treatment air is exhausted from the zone oven 22 through the zone outlet 30. This waste treatment air has a waste treatment air temperature and waste treatment air dew point temperature that differs from the treatment air temperature and treatment air dew point temperature of the original treatment air. This waste treatment air can be conditioned to create new treatment air having the same treatment air temperature and treatment air dew point temperature of the original treatment air to treat additional product in process.

The heat recovery system 20 may include an oven heat source 44 that is disposed adjacent the zone inlet 32. The oven heat source 44 is a means for conditioning the treatment air. The oven heat source 44 optionally conditions the treatment air by heating the treatment air prior to entering the oven zone 24 to treat the product in process. In the exemplary embodiment, the oven heat source 44 is a flame that heats the treatment air to a specific treatment air temperature and treatment air dew point temperature. While a flame is used in the exemplary embodiment to heat and condition the treatment air, any heat source known in the art for generating heat and heating air may be used.

The oven duct assembly 28 may include an oven cyclone 46 that is disposed at the zone outlet 30 to exhaust the waste treatment air following the treatment of the product in process. In addition, at least one oven exhaust fan 48, 50 may be secured to the oven duct assembly 28 to pull the waste treatment air from the zone outlet 30. Also, the at least one oven exhaust fan 48, 50 may introduce ambient air to the waste treatment air to condition the waste treatment air. The ambient air introduced into the oven duct assembly 28 dilutes the humidity of the waste treatment air in addition to cooling the waste treatment air. In an alternative embodiment, at least one pressure fan may be secured to the oven duct assembly 28 to pull the waste treatment air from the zone outlet 30. Also, the at least one pressure fan may introduce ambient air to the waste treatment air to condition the waste treatment air. In a system using the at least one pressure fan, a damper may be used to control the inlet and outlet of waste treatment air and ambient air.

In the exemplary embodiment, the heat recovery system 20 includes a plurality of oven exhaust fans 48, 50, and more specifically two oven exhaust fans 48, 50. Each of the plurality of oven exhaust fans 48, 50 are capable of moving the waste treatment air from the zone outlet 30 and introducing ambient air to the waste treatment air to condition the waste treatment air. In the exemplary embodiment, a first oven exhaust fan 48 is disposed adjacent the zone outlet 30 to pull the waste treatment air from the zone outlet 30. In addition, the first oven exhaust fan 48 may introduce ambient air to the waste treatment air at the zone outlet 30 to condition the waste treatment air. A second oven exhaust fan 50 may be disposed adjacent the zone inlet 32. The second oven exhaust fan 50 may be used to pull the waste treatment air through the oven duct assembly 28, to introduce ambient air to the waste treatment air to condition the waste treatment air, introduce ambient air to the oven heat source 44, or any combination thereof.

To further condition the waste treatment air, the system may include an oven exhaust flue 52 that extends from the oven duct assembly 28 to bleed off at least a portion of the waste treatment air from the oven duct assembly 28. This controlled bleed of treatment air acts to condition the waste treatment air in the oven duct assembly 28. The oven exhaust flue 52 may be any duct work known in the art. An oven duct regulator 70 may be used to control the flows of the treatment air, waste treatment air and ambient ah, through, into and out the oven duct assembly 28.

While for exemplary purposes only one oven zone 24 is discussed, the least one oven zone 24 may be a plurality of oven zones 24 that are disposed downstream of the preheating zone 26. Each of the plurality of oven zones 24 are similarly configured to treat the product in process, exhaust the waste treatment air, and condition the waste treatment air to create new treatment air for treating additional product in process.

The heat recovery system 20 further includes a longitudinally extending preheating zone 26. The preheating zone 26 preheats the product in process prior to entering the at least one preheating zone 26. The preheating zone 26 defines a passageway therethrough for the placement of the transfer device 42 through the preheating zone 26. The preheating zone 26 is disposed upstream of the at least one oven zone 24. The preheating zone 26 may be one of the plurality of oven zones 24 of it may be a separate structure independent of the oven 22. The preheating zone 26 defines a preheating inlet 38 to introduce a preheating air having a preheating air temperature and preheating air dew point temperature into the preheating zone 26. The preheating air preheats the product in process in the preheating zone 26. The preheating zone 26 further defines a preheating outlet 36 that exhausts the waste preheating air following the preheating of the product in process in the preheating zone 26. The preheating air temperature is sufficient to preheat the product in process to a product temperature that is at least equal to the treatment air due point temperature. These equal temperatures result in a product in process without any sweat or surface condensation during treatment in the oven zone 24. In the exemplary embodiment, the product temperature is greater than the treatment air due point temperature as the product entering the oven zone 24 for treatment.

A preheating duct assembly 34 extends from the preheating outlet 36 to the preheating inlet 38. The preheating duct assembly 34 may be any type of duct work known in the art. The preheating duct assembly 34 exhausts the waste preheating air from the preheating zone 26 following the preheating of the product in process and transfers the waste preheating air away from the preheating outlet 36. In the exemplary embodiment, the preheating duct assembly 34 transfers the waste preheating air to the preheating inlet 38 to be recycled and used again as preheating air to preheat the product in process. In alternative embodiment, where the preheating zone 26 is a single pass oven, the preheating duct assembly 34 may transfer the waste preheating air away from the preheating zone 26 and out of the facility housing the preheating zone 26.

In order for the waste preheating air to be reused as preheating air, the waste preheating air may need to be conditioned. The waste preheating air may be conditioned in the preheating duct assembly 34 to create new preheating air to preheat additional product in process. That is, the original preheating air is fed into the preheating zone 26 through the preheating inlet 38 at a specific preheating air temperature and preheating air dew point temperature. After the preheating air has preheated the product in process, the waste preheating air is exhausted from the preheating zone 26 through the preheating outlet 36. This waste preheating air has a waste preheating air temperature and waste preheating air dew point temperature that differs from the preheating air temperature and preheating air dew point temperature of the original preheating air. This waste preheating air can be conditioned to create new preheating air having the same preheating air temperature and preheating air dew point temperature of the original preheating air to preheat additional product in process.

The heat recovery system 20 may include a preheating heat source 54 that is disposed adjacent the preheating inlet 38. The preheating heat source 54 is a means for conditioning the preheating air. The preheating heat source 54 optionally conditions the preheating air by heating the preheating air prior to entering the preheating zone 26 to preheat the product in process. In the exemplary embodiment, the preheating heat source 54 is a flame that heats the preheating air to a specific preheating air temperature and preheating air dew point temperature. While a flame is used in the exemplary embodiment to heat and condition the preheating air, any heat source known in the art for generating heat and heating air may be used.

The preheating duct assembly 34 may include a preheating cyclone 56 that is disposed at the preheating outlet 36 to exhaust the waste preheating air following the preheating of the product in process. In addition, at least one preheating exhaust fan 58, 60 may be secured to the preheating duct assembly 34 to pull the waste preheating air from the preheating outlet 36. Also, the least one preheating exhaust fan 58, 60 may introduce ambient air to the waste preheating air to condition the waste preheating air. The ambient air introduced into the preheating duct assembly 34 dilutes the humidity of the waste preheating air in addition to cooling the waste preheating air. In an alternative embodiment, at least one pressure fan may be secured to the preheating duct assembly 34 to pull the waste preheating air from the preheating outlet 36. Also, the at least one pressure fan may introduce ambient air to the waste preheating air to condition the waste preheating air. In a system using the at least one pressure fan, a damper may be used to control the inlet and outlet of waste preheating air and ambient air.

In the exemplary embodiment, the heat recovery system 20 includes a plurality of preheating exhaust fans 58, 60, and more specifically two preheating exhaust fans 58, 60. Each of the plurality of preheating exhaust fans 58, 60 are capable of moving the waste preheating air from the preheating outlet 36 and introducing ambient air to the waste preheating air to condition the waste preheating air. In the exemplary embodiment, a first preheating exhaust fan 58 is disposed adjacent the preheating outlet 36 to pull the waste preheating air from the zone outlet 30. In addition, the first preheating exhaust fan 58 may introduce ambient air to the waste preheating air to condition the waste preheating air. A second preheating exhaust fan 60 may be disposed adjacent the preheating inlet 38. The second preheating exhaust fan 60 may be used to pull the waste preheating air through the preheating duct assembly 34, to introduce ambient air to the waste preheating air to condition the waste preheating air, introduce ambient air to the preheating heat source 54, or any combination thereof.

To further condition the waste preheating air, the system may include a preheating exhaust flue 62 that extends from the preheating duct assembly 34 to bleed off at least a portion of the waste preheating air from the preheating duct assembly 34. This controlled bleed of preheating air acts to condition the waste preheating air in the preheating duct assembly 34. The preheating exhaust flue 62 may be any duct work known in the art. An exhaust duct assembly 64 may be used in the heat recovery system 20 to transfer the controlled bleed, from both the oven exhaust flue 52 and the preheating exhaust flue 62, away from the heat recovery system 20. The oven exhaust flue 52 extends to the exhaust duct assembly 64 such that the exhaust duct assembly 64 receives the bleed off from at least a portion of the waste treatment air from the oven duct assembly 28 and transfers this controlled bleed away from the heat recovery system 20. In addition, the preheating exhaust flue 62 extends to the exhaust duct assembly 64 such that the exhaust duct assembly 64 receives the bleed off from at least a portion of the waste preheating air from the preheating duct assembly 34 and transfers this controlled bleed away from the heat recovery system 20.

The heat recovery system 20 includes a transfer duct 40 that extends between the oven duct assembly 28 and the preheating duct assembly 34. The transfer duct 40 transfers a portion of waste treatment air from the oven duct assembly 28 to the preheating duct assembly 34. The transfer duct 40 may be any duct work known in the art. The transfer duct 40 transfers a portion of the waste treatment air to the preheating duct assembly 34 to condition the waste preheating air in the preheating duct assembly 34. This conditioning is achieved by heating the waste preheating air with the waste treatment air. A preheating duct regulator 72 may be used to control the flows of the preheating air, waste preheating air, waste treatment air and ambient air, through, into and out the preheating duct assembly 34.

As described above, while the exemplary embodiment teaches the use of recirculated ovens 22 for both the oven 22 and preheating zone 26, the heat recovery system 20 can be any combination of ovens 22 and preheating zones 26 known in the art. In an exemplary embodiment, both the oven 22 and preheating zone 26 can be recirculated ovens 22. In an alternative embodiment, both the oven 22 and preheating zone 26 can be single pass ovens 22. In another alternative embodiment as seen in FIG. 2, one of the oven 22 and the preheating zone 26 can be a recirculated oven 22 with the other of the oven 22 and the preheating zone 26 being a single pass oven 22. In addition, the oven 22 can be a plurality of ovens 22 or oven zones 24 with waste treatment air being recycled from at least one of the plurality of ovens 22 or oven zones 24.

The subject invention further provides for a method of recycling waste treatment air used in a downstream oven zone 24 of an oven 22 to create a preheating air to preheat a product in process prior to entering the downstream oven zone 24. When the heat recovery system 20 includes both an oven 22 and preheating zone 26 that are recirculated ovens 22 the method of recycling waste treatment air used in a downstream oven zone 24 of an oven 22 allows for the conditioning of the waste preheating air in an upstream preheating zone 26. The waste preheating air is conditioned to create the preheating air that preheats the product in process prior to entering the downstream oven zone 24. The method may begin with the optional step of disposing the product in process on the transfer device 42 for movement of the product in process in a downstream direction through the preheating zone 26 and the oven zone 24. The product in process is moved in the downstream direction along the transfer device 42. The oven 22, having at least one longitudinally extending oven zone 24 that treats the product in process, along with the longitudinally extending preheating zone 26 that preheats the product in process prior to entering the at least one oven zone 24, are disposed over the transfer device 42.

The treatment air, having the treatment air temperature and the treatment air dew point temperature, is introduced through the zone inlet 32 in the oven zone 24 to treat the product in process. The product in process is next treated in the at least one oven zone 24 with the treatment air. Treating of the product in process includes, but is not limited to heating the product in process to dry, bake, rehydrate, ferment or toast the product in process.

Once the product in process has been treated, the waste treatment air is exhausted through the zone outlet 30 in the at least one oven zone 24. In a single pass oven 22, the waste treatment air may be exhausted from the at least oven zone 24 and exhausted out of the facility in which the at least one oven 22 is housed. In a recirculated oven 22, the zone outlet 30 is connected to the zone inlet 32 by the oven duct assembly 28. The oven duct assembly 28 exhausts and transfers the waste treatment air from the zone outlet 30 to the zone inlet 32 and may condition the waste treatment air to create new treatment air for treating additional product in process. This exhausting of waste treatment air from the at least one oven zone 24 may be accomplished with the at least one oven exhaust fan 48, 50 that pulls the waste treatment air from the at least one oven zone 24 to exhaust the waste treatment air in a single pass oven 22 or recycle a portion of the waste treatment air in a recirculated oven 22. In the exemplary embodiment, the waste treatment air in the oven duct assembly 28 is conditioned to create new treatment air having the treatment air temperature and the treatment air dew point temperature. This new treatment air is used to treat additional product in process in the oven zone 24 and is fed into the oven zone 24 via the zone inlet 32.

Prior to the treatment air entering the oven zone 24 to treat the product in process, the treatment air may be conditioned to achieve the desired treatment air temperature and treatment air dew point temperature. This conditioning may be accomplished through any number of optional steps. For example, the treatment air may be heated with the oven heat source 44 to condition the treatment air prior to entering the oven zone 24. In addition, ambient air may be introduced to the waste treatment air to condition the waste treatment air and create the treatment air prior to entering the oven zone 24. Optionally, the method may further include the step of controlling the flows of the treatment air, waste treatment air and ambient air, through, into and out the treatment duct assembly with the treatment duct regulator 70. These controlled flows further condition the waste treatment air to create the new treatment air for treating the product in process.

Next, the preheating air having the preheating air temperature and the preheating air dew point temperature is introduced through a preheating inlet 38 into the preheating zone 26 to preheat the product in process. The product in process is preheated to a product temperature that is at least equal to the treatment air dew point temperature. By preheating the product in process to this product temperature, condensation or sweat that forms on the product in process when the product temperature is less than the treatment air dew point temperature is eliminated.

Once the product in process has been preheated, the waste preheating air is exhausted through the preheating outlet 36 in the preheating zone 26. In a single pass preheating zone 26, the waste preheating air may be exhausted from the preheating zone 26 and exhausted out of the facility in which the preheating zone 26 is housed. In a recirculated preheating zone 26, the preheating outlet 36 is connected to the preheating inlet 38 by the preheating duct assembly 34. In the exemplary embodiment, the preheating outlet 36 is connected to the preheating inlet 38 by the preheating duct assembly 34. The preheating duct assembly 34 may exhaust and transfer the waste preheating air from the preheating outlet 36 to the preheating inlet 38 and condition the waste preheating air to create new preheating air for preheating additional product in process. This exhausting of waste preheating air from preheating zone 26 may be accomplished with the at least one preheating exhaust fan 58, 60 that pulls the waste preheating air from the preheating zone 26 to exhaust the waste preheating air in a single pass preheating zone 26 or recycle a portion of the waste preheating air in a recirculated preheating zone 26.

Prior to die preheating air entering the preheating zone 26 to preheat the product in process, the preheating air may be conditioned to achieve the desired preheating air temperature and preheating air dew point temperature. This conditioning may be accomplished through any number of optional steps. For example, the preheating air may be heated with the preheating heat source 54 to condition the preheating air prior to entering the preheating zone 26. The preheating air may be heated with the waste treatment air to condition the preheating air prior to entering the preheating zone 26. In addition, ambient air may be introduced to the waste preheating air to condition the waste preheating air and create the preheating air prior to entering the preheating zone 26. Optionally, the method may further include the step of con trolling the flows of the preheating air, waste preheating air, waste treatment air and ambient air, through, into and out the preheating duct assembly 34 with the preheating duct regulator 72. These controlled flows further condition the waste treatment air to create the new treatment air for treating the product in process.

In the exemplary embodiment, using a recirculated oven 22 and recirculated preheating zone 26, a portion of waste treatment air is transferred through the transfer duct 40 that extends between the oven duct assembly 28 and the preheating duct assembly 34 to heat the waste preheating air in the preheating duct assembly 34. The waste preheating air is then conditioned with the waste treatment air to create new preheating air. The waste preheating air is conditioned with the waste treatment air to create new preheating air having the preheating air temperature and the preheating air dew point temperature.

In an alternative embodiment, using a single pass oven 22 and a single pass preheating zone 26, the waste treatment air is exhausted through the oven duct assembly 28 and a portion of the waste treatment air is transferred through the transfer duct 40 to the preheating zone 26. The preheating air, which is created from the waste treatment air is then introduced into the preheating zone 26 through the preheating inlet 38 to preheat additional product in process. The preheating air can be created from the waste treatment air by conditioning the waste treatment air that is transferred to the preheating zone 26. Conditioning of the waste treatment air includes, but is not limited to at one of bleeding off a portion of the waste treatment air, heating the waste treatment air, diluting the waste treatment air with ambient air or any combination thereof to achieve a desired preheating air temperature and preheating air dew point temperature.

Lastly, the new preheating air is introduced into the preheating zone 26 to preheat the product in process to a product temperature that is at least equal to the treatment air dew point temperature, thus eliminating sweat or surface condensation on the product in process during treatment of the product in process in the downstream oven zone 24. In the exemplary embodiment, the product in process in the preheating zone 26 is heated with the preheating air to a product temperature that is greater than the treatment air dew point temperature.

As a result of the preheating, the product in process does not have any condensation or sweat and the operating conditions in the treatment oven zones 24, i.e., drying, baking, rehydrating, fermenting or toasting, are modified to elevate the humidity in these zones. The increased humidity elevates the heat transfer rate of the drying, baking, rehydrating, fermenting or toasting air and increases the heat absorbed by the product in process. The elevated heat transfer rate increases the capacity of the oven 22, dryer or toaster.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method of recycling waste treatment air used in a heat recovery system having a preheating zone and a downstream oven zone of an oven for creating a preheating air to preheat a product in process prior to entering the downstream oven zone, the downstream oven zone having a zone outlet and a zone inlet, the preheating zone having a preheating inlet and a preheating outlet, the method comprising the steps of:

exhausting a waste treatment air through an oven duct assembly secured to the zone outlet in the downstream oven zone following a treatment of a product in process;

transferring at least a portion of the waste treatment air from the zone outlet to the zone inlet;

transferring a portion of the waste treatment air through a transfer duct extending between the oven duct assembly and the preheating zone;

conditioning the waste treatment air to create a preheating air having a preheating air temperature and a preheating air dew point temperature;

introducing the preheating air into the preheating zone through the preheating inlet to preheat additional product in process;

exhausting a waste preheating air through the preheating outlet in the preheating zone following the preheating of the product in process; and connecting the preheating outlet to the preheating inlet with a preheating duct assembly to transfer at least a portion of the waste preheating air from the preheating outlet to the preheating inlet, and conditioning the at least a portion of the waste preheating air for creating a new preheating air to preheat additional product in process.

2. The method of recycling waste treatment air as set forth in claim 1 further including the step of introducing a treatment air having a treatment air temperature and a treatment air dew point temperature into the oven zone through the zone inlet for treating the product in process.

3. The method of recycling waste treatment air as set forth in claim 2 further including the step of preheating the product in process to a product temperature being at least equal to the treatment air dew point temperature of the treatment air in the oven zone for eliminating surface condensation on the product in process during the introducing treatment air step.

4. The method of recycling waste treatment air as set forth in claim 2 further including the step of connecting the zone outlet to the zone inlet with the oven duct assembly.

5. The method of recycling waste treatment air as set forth in claim 1 further including the step of conditioning the waste treatment air in the oven duct assembly.

6. The method of recycling waste treatment air as set forth in claim 5 wherein the step of conditioning the waste treatment air is further defined by heating the waste treatment air with an oven heat source.

7. The method of recycling waste treatment air as set forth in claim 5 wherein the step of conditioning the waste treatment air is further defined by introducing ambient air to the waste treatment air.

8. The method of recycling waste treatment air as set forth in claim 7 wherein the step of introducing ambient air is further defined by controlling the flows of the treatment air, the waste treatment air and the ambient air, through, into and out the treatment duct assembly with a treatment duct regulator.

9. The method of recycling waste treatment air as set forth in claim 7 further including the step of treating the product in process in the downstream oven zone with the treatment air.

10. The method of recycling waste treatment air as set forth in claim 9 wherein the treating the product in process step is further defined as heating the product in process to dry, bake, rehydrate, ferment or toast the product in process.

11. The method of recycling waste treatment air as set forth in claim 1 wherein the transferring step is further defined as transferring a portion of waste treatment air through a transfer duct extending between the oven duct assembly.

12. The method of recycling waste treatment air as set forth in claim 1 wherein the step of conditioning the waste preheating air is further defined by introducing ambient air to the waste preheating air to condition the waste preheating air.

13. The method of recycling waste treatment air as set forth in claim 12 further including the step of controlling the flows of the preheating air, the waste preheating air, the waste treatment air and the ambient air, through, into and out the preheating duct assembly with a preheating duct regulator.

14. The method of recycling waste treatment air as set forth in claim 1 further including the step of preheating the product in process in the preheating zone with the preheating air for eliminating surface condensation on the product in process during treatment in the downstream oven zone.

15. The method of recycling waste treatment air as set forth in claim 3 wherein the preheating the product in process step is further defined as heating the product in process in the preheating zone with the preheating air to a product temperature being greater than the treatment air dew point temperature.

16. The method of recycling waste treatment air as set forth in claim 1 further including the step of moving the product in process in the downstream direction along a transfer device through the preheating zone and the downstream oven zone.

17. The method of recycling waste treatment air as set forth in claim 1 further including the step of transferring at least a portion of the waste preheating air from the preheating outlet to the preheating inlet.

18. The method of recycling waste treatment air as set forth in claim 1 wherein transferring a portion of the waste treatment air through a transfer duct extending between the oven duct assembly and a preheating zone includes:
    transferring waste treatment air from the zone inlet to the transfer duct; and
    transferring waste treatment air from the transfer duct to the preheating inlet.

19. The method of recycling waste treatment air as set forth in claim 18 further including the step of transferring waste treatment air from the transfer duct to a first exhaust flue.

20. The method of recycling waste treatment air as set forth in claim 19 further including the step of transferring waste preheating air from the preheating duct assembly to a second exhaust flue.

* * * * *